US005700165A

United States Patent [19]
Harris et al.

[11] Patent Number: 5,700,165
[45] Date of Patent: Dec. 23, 1997

[54] FUSED HIGH AMPACITY ELECTRICAL QUICK DISCONNECT

[75] Inventors: Brent Alan Harris, Alexandria; Shawn Daren Drew; Arnold Carl Rybolt, both of Anderson, all of Ind.

[73] Assignee: General Motors Corporation, Detroit, Mich.

[21] Appl. No.: 570,385

[22] Filed: Dec. 11, 1995

[51] Int. Cl.[6] .................................................. H01R 33/95
[52] U.S. Cl. ........................................... 439/621; 439/188
[58] Field of Search .................................... 439/622, 411, 439/621, 412

[56] References Cited

U.S. PATENT DOCUMENTS

| | | | |
|---|---|---|---|
| 3,107,966 | 10/1963 | Boubomme | 339/241 |
| 4,720,157 | 1/1988 | Nestor et al. | 439/851 |
| 4,750,897 | 6/1988 | Neidecker | 439/825 |
| 4,997,394 | 3/1991 | Katz et al. | 439/622 |
| 5,429,530 | 7/1995 | Zander et al. | 439/622 |

FOREIGN PATENT DOCUMENTS

| | | |
|---|---|---|
| 13629040 | 3/1987 | Germany. |
| 13608276 | 9/1987 | Germany. |
| 13734682 | 5/1988 | Germany. |

OTHER PUBLICATIONS

Soviet Inventions Illustrated, R section, week 7915, 1979 May 23, Derwent Publications Ltd., London; SU–A–609 139 (BRON).

"Radsok" Product Brochure –Date Unknown.

Joe Koch, "Hyperbolic Connector Terminal Design for High Amperage Applications" –Date Unknown.

*Primary Examiner*—Neil Abrams
*Assistant Examiner*—Eugene G. Byrd
*Attorney, Agent, or Firm*—Lawrence B. Plant

[57] ABSTRACT

A high ampacity, high voltage, fused electrical disconnect having a pair of input and output terminals carried by a housing and in registry with a pair of input and output rods carried by a cover and connected to each other by a fuse. The rods are readily detachable from the cover and the fuse. A switch in the housing signals when the rods are engaged with the terminals.

20 Claims, 2 Drawing Sheets

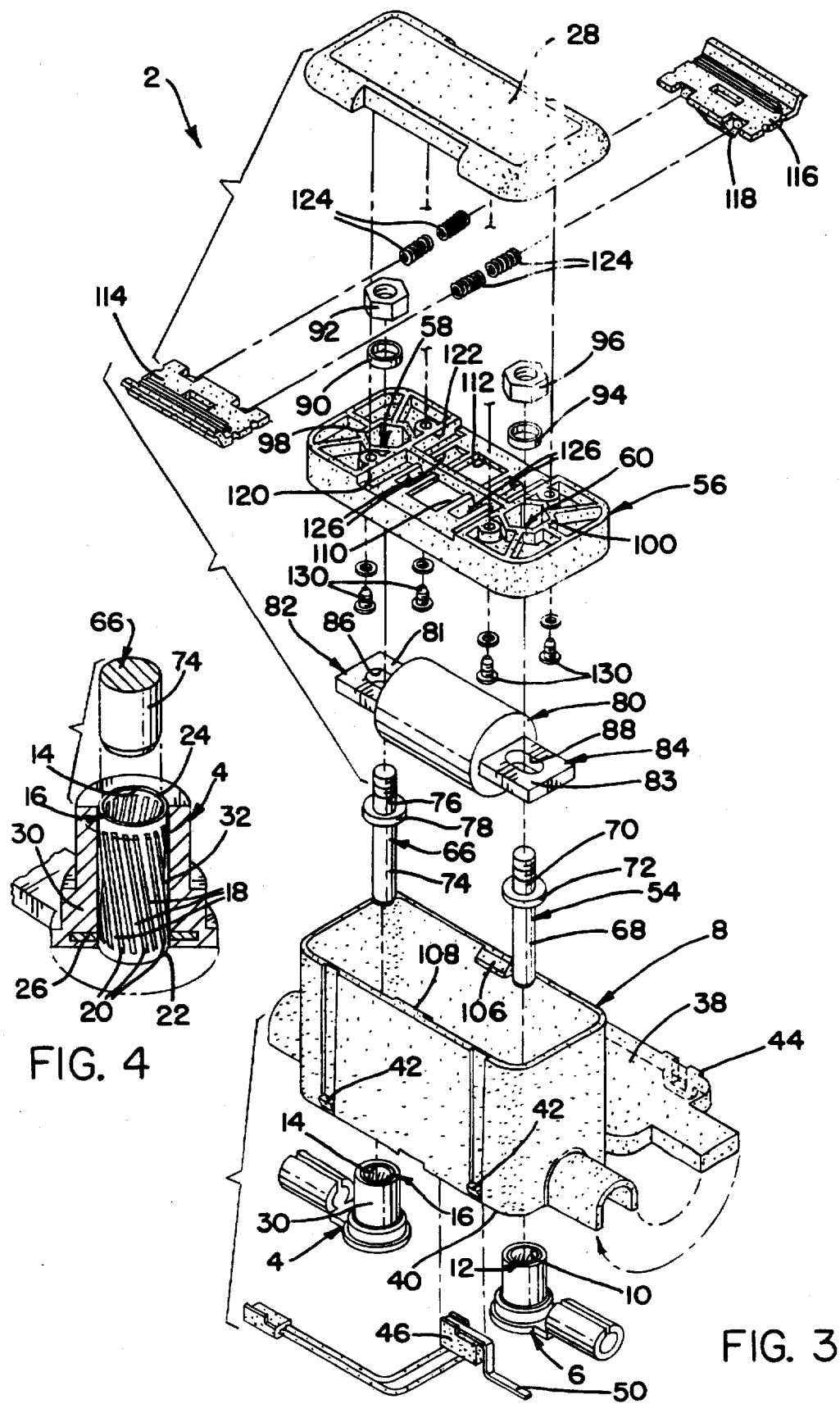

FUSED HIGH AMPACITY ELECTRICAL QUICK DISCONNECT

This invention relates to a compact fused, electrical quick disconnect for high voltage, high amperage electrical systems such as are employed in electric vehicles.

BACKGROUND OF THE INVENTION

It is known to have manual electrical disconnects between high amperage, high voltage power supplies and the electrical loads they serve. Electric vehicles have compact such disconnects to isolate the battery from the electric drive and control system, particularly during maintenance of such systems or the battery. Any electrical disconnect in an electric vehicle must not only have low mass and low volume, but should also be simple to operate, readily accessible, readily maintainable, and capable of operating in an automotive environment which is subject to vibrations, corrosion and wide temperature variations. One such disconnect is the subject of copending U.S. patent application Ser. No. 08/335,239 filed Nov. 7, 1994 and assigned to the assignee of the present invention. It is desirable that the main power system of an electric vehicle include at least one fuse capable of disrupting current flow under electrical overload conditions. Like the quick disconnect, the fuse should be readily accessible, and readily replaceable should the need arise.

SUMMARY OF INVENTION

This invention comprehends a combined, high voltage, high ampacity quick disconnect and a readily replaceable fuse for (1) manually disconnecting electrical power to a load when so desired, or (2) automatically disconnecting such power from the load in case of system overloads. The invention is particularly useful in electric vehicles, but may also be used in other applications (e.g., stationary power systems). The fused quick disconnect includes an input terminal receiving electrical current from the supply, and an output terminal receiving electrical current from the input terminal for delivering it to the load. The input terminal has a first electrically conductive sleeve for snugly receiving a first electrically conductive rod therein. Similarly, the output terminal has a second electrically conductive sleeve for snugly receiving a second electrically conductive rod therein. An insulated housing holds the terminals side-by-side but spaced apart from each other. A manually removable cover for the housing carries the first and second conductive rods which are secured thereto and registered with their respective input and output terminals and electrically connected to each other via a fuse which is detachably secured to the rods in the cover. The cover includes at least one catch which engages at least one detent on the housing for locking the cover to the housing. The rods will preferably comprise a cylindrical copper bar having a diameter commensurate with the maximum current the fused disconnect is designed to carry.

The sleeves of the terminals are electrically connected to input and output cables or the like, and preferably comprise a bundle of parallel wires joined together at their ends and capable of expanding and contracting radially to snugly engage the bars inserted therein. The wire bundle will preferably be necked down at a location midway between the ends of the wires such that the sleeve has a generally hyperbolic or hour-glass shape as is well known in the electrical connector art. The necked-down portion of the sleeve is smaller than the outside diameter of the bar it mates with, but is readily expansible when the bar is inserted therein. Once expanded, the sleeve constrictively engages the outer surface of the rod over substantially the entire length of the sleeve hence resulting in a low resistance electrical connection therebetween without holding the bar so tightly that it is not easily inserted into or pulled out of the sleeve. Preferably, the wires comprising the sleeves are skewed with respect to the central axis of the sleeve with which they are associated such that the sleeve has a helical configuration. Most preferably, the wires are flat so that a large surface area thereof will engage the rod for a maximum low resistance conductivity.

The housing includes a pair of internal recesses each receiving one of the input or output terminals and holding them securely in place. A detachable closure wall closes off the recesses and traps the terminals therein. A pocket in the housing receives a tell-tell switch which is activated when the rods are seated in their respective terminal sleeves.

DETAILED DESCRIPTION OF A SPECIFIC EMBODIMENT OF THE INVENTION

The present invention will be more readily understood when considered in the light of the following detailed discussion of a specific embodiment thereof which is given hereafter in conjunction with the several figures in which:

FIG. 3 is an exploded isometric view of the fused quick-disconnect of FIG. 1; and FIG. 4 is a partially sectioned isometric view of a terminal sleeve used in conjunction with the fused quick-disconnect of the present invention.

Figure 1:
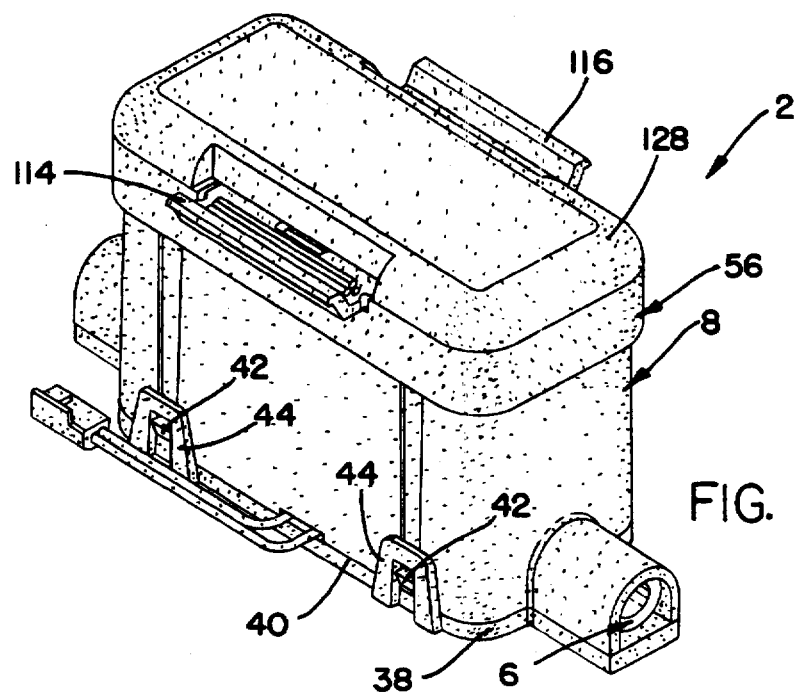
FIG. 1 is an isometric view of a fused quick-disconnect in accordance with the present invention.

The several Figures depict a compact, high ampacity (e.g., ca. 400 amps continuous at 25° C.), high voltage (e.g., ca. 500 volts) fused quick-disconnect 2 including an input terminal 4, and an output terminal 6 held in spaced apart, side-by-side relation by an one-piece molded nonconductive housing 8. The disconnect 2 is capable of handling ultra-high amperage excursions of about 2500 amps for 50–200 milliseconds before the fuse component thereof blows.

The output terminal 6 has an opening 10 therein defined by a sleeve 12. The input terminal 4 has a similar opening 14 defined by a similar sleeve 16. Since both terminals 4 and 6 are identical, only terminal 6 is described in detail. As best shown in FIG. 4, the sleeve 16 preferably comprise a plurality of wires 18 separated by slots 20 which are joined together at their ends 22 and 24. The end 22 is connected to a blade-like connector 26 which is embedded in the terminal 4 which, in turn, is connected to the cable 28. A metal cylinder 30 surrounds the sleeve 16 and conducts current to or from the sleeve 16 depending on the direction of current flow. The several wires 18 are preferably skewed relative to the center axis of the opening 14 so as to provide a helical sleeve 16. This is conveniently accomplished by twisting the sleeve 16 which also causes the center of the sleeve 16 to become necked down at the reduced diameter zone 32 and the sleeve 16 itself to take on a hyperbolic or hour-glass shape. Terminals of this type are known in the electrical connector art as hyperbolic or helical terminals. A preferred such terminal for this application is commercially available from the RADSOC Co.

Terminals 4 and 6 fit into conforming recesses 34 and 36 molded into the housing 8. A closure wall 38 is hinged (not shown) to one edge of the bottom of the housing 8, and is locked to the other edge 40 of the container 8 by means of detents 42 on the outside of housing 8 and clasps 44 on the closure wall 38. The clasps 44 snap over the detents 42 when the closure wall 38 is pivoted about its hinge to underlie and close-off the housing 8. The closure wall 38 is readily disengaged from the underside of the housing 8 by disengaging the clasps 44 (e.g., by means of a screwdriver) from the detents 42 and pivoting it back out of way as best shown in FIG. 3.

A switch 46 is positioned in a pocket 48 molded inside the housing 8, and includes an arm 50 extending into a recess 52 in the closure wall 38 for engagement/disengagement by the rod 54 which mates with the sleeve 12. The switch 46 is a telltale which serves (1) to signal whether or not the disconnect is engaged or disengaged (and accordingly whether or not the power is connected or disconnected from the load), and/or (2) to initiate other electrical disconnects (e.g., relays) which serve to further isolate the battery from the vehicle's electrical system when the disconnect is not properly in place.

Figure 2:
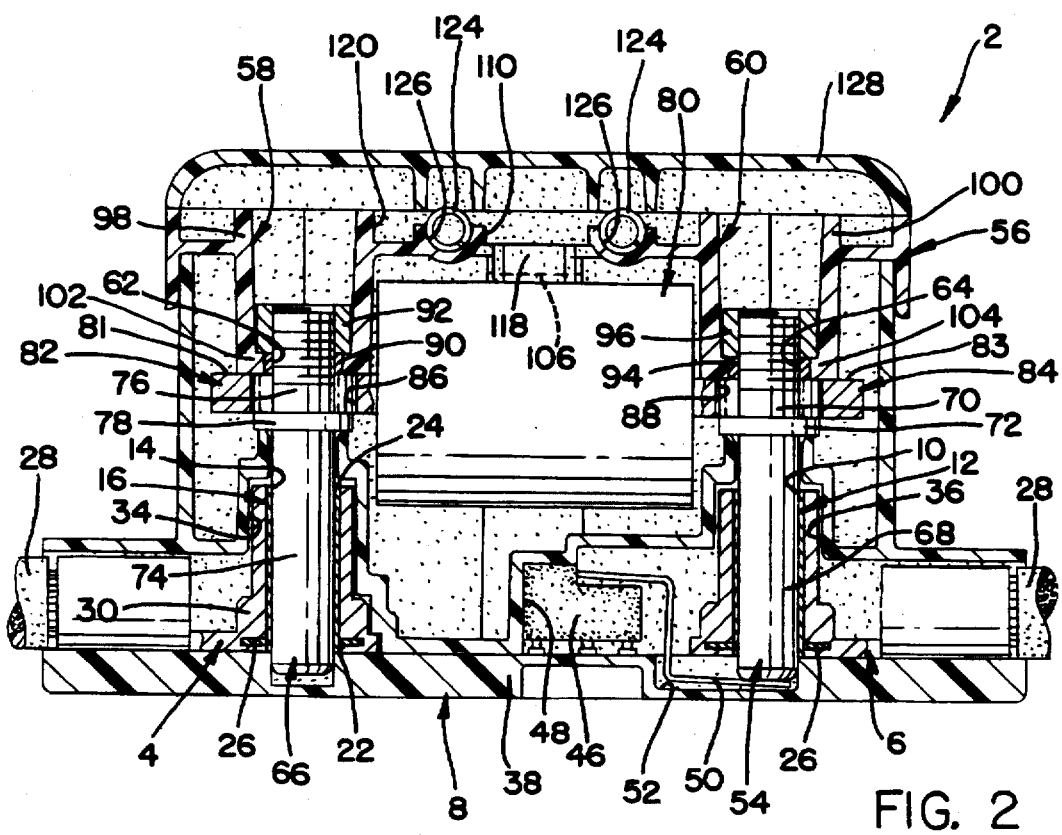
FIG. 2 is a longitudinal sectional view of the fused quick-disconnect of FIG. 1.

A manually removable cover 56 is adapted to nest with, and close-off, the top of the housing 8 as best shown in FIG. 2. The cover 56 includes a plurality of internal walls defining a pair of wells 58 and 60 having openings 62 and 64 at the bottoms thereof for admitting the rods 54 and 66 into the wells 58 and 60. More specifically, the rod 54 includes a shank portion 68, a threaded stud portion 70 and a flange portion 72 intermediate the shank and stud portion 68 and 70. Similarly, the rod 66 includes a shank portion 74, a stud portion 76 and an intermediate flange portion 78. A fuse 80 having a first terminus 82 and a second terminus 84 is located in the cover 56 between the rods 54 and 66 for electrically connecting the rods 54 and 66 to each other. The terminus 82 of the fuse 80 has an opening 86 through which the threaded stud 76 of rod 66 extends, and the terminus 84 has an opening 88 through which the threaded stud 70 of rod 54 extends. A metal spacer 90 fits in the opening 62 and bears against the top surface 81 of the terminus 82 and the underside of a nut 92 which threads onto the stud 76 to hold the rod 66 securely in place in the cover 56. Similarly, a metal spacer 94 fits in the opening 64 around the threaded stud 70 and between the upper surface 83 of the terminus 84 and a nut 96. The nuts 92 and 96 each have a polygonal outside perimeter (e.g., a hexnut) and the walls 98 and 100 defining the wells 58 and 60 conform to the shape of the nuts 92 and 96 so as to prevent rotation of the nuts therein when the rods 54 and 66 are screwed into the nuts 92 and 96. The rods 54 and 66 are screwed tightly into the nuts 92 and 96 so as to sandwich (1) the terminus 82 between the flange 78 and the spacer 90, and (2) the terminus 84 between the flange 72 and the spacer 94. At the same time, a collar 102 at the bottom of the well 58 surrounds the spacer 90 and is pinched between the underside of the nut 92 and the top surface 81 of the terminus 82 for securely holding the rod 66 thereto and to the terminus 82. Similarly, a collar 104 at the bottom of the well 60 is pinched between the underside of the nut 96 and the top surface 83 of the terminus 84 for securely anchoring the rod 54 to the cover 56 and to the terminus 84. When so anchored, the rods 54 and 66 will be so spaced as to be in registry with the openings 10 and 14 in the sleeves 12 and 16 of the terminals 4 and 6.

The cover 56 is adapted to be locked to the top of the housing 8 by means of fixed detents 106 and 108 molded on the inside top edge of the housing 8 (see FIG. 3). When the cover 56 is in place atop the housing 8, the fixed detents 106 and 108 will lie directly below openings 110 and 112 in the cover 56. Latch handles 114 and 116 each carry a catch 118 (shown only on handle 116) which passes through the opening 112 and engages the fixed detent 106. A similar catch on handle 114 (not shown) passes through the opening 110 in the cover 56 and engages the fixed detent 108. The handles 114 and 116 are adapted to slide to and fro in slots 120 and 122 respectively in the cover 56, and are biased outwardly and apart from each other by coil springs 124 which nest in pockets 126 formed in the cover 56. Hence with the springs pushing the handles 114 and 116 outwardly, the catches 118 engage the detents 106 and 108 and lock the cover 56 in place. To remove the cover 56, the handles 114 and 116 are squeezed together to compress the springs 124 and disengage the catches 118 from the respective detents 106 and 108. A lid 128 is secured atop the cover 56 by screws 130, and serves to hold the handles 114 and 116 in place and close-off the top of the open cover 56. The lid 128 is readily removed to provide access to the nuts 92 and 96 used to hold the rods 54 and 66 in place.

While the invention has been disclosed primarily in terms of a specific embodiment thereof it is not intended to be limited thereto but rather only to the extent set forth hereafter in the claims which follow.

What is claimed is:

1. A high voltage, high ampacity, fused quick disconnect for alternately connecting and disconnecting an electrical power supply to/from an electrical load comprising:
    an input terminal receiving electrical current from said supply, said terminal having a first electrically conductive sleeve defining a first opening adapted to snugly receive a first electrically conductive rod;
    an output terminal receiving electrical current from said input terminal for delivering said current to said load, said output terminal having a second electrically conductive sleeve defining a second opening adapted to snugly receive a second electrically conductive rod;
    an insulated housing holding said terminals side-by-side and apart from each other;
    a cover for said housing;
    a first electrically conductive rod secured to said cover and conforming substantially to said first opening for engaging and disengaging said first sleeve;
    a second electrically conductive rod secured to said cover and conforming substantially to said second opening for engaging and disengaging said second sleeve; and
    a replaceable, current sensitive fuse having a first terminus detachably secured to said first rod in said cover, and a second terminus detachably secured to said second rod in said cover to conduct electrical current between said rods under normal current load conditions, and to fail open under overload current conditions;
whereby placement of said cover on said housing electrically couples said terminals together and removal of said cover electrically disconnects said terminals one from the other when said fuse is intact, and permits ready replacement of said fuse off-line from said power supply when said fuse has failed.

2. A disconnect according to claim 1 wherein said rod is cylindrical.

3. A disconnect according to claim 2 wherein said sleeves comprise a bundle of parallel wires joined together at both ends thereof.

4. A disconnect according to claim 3 wherein said bundle is necked down between said ends such that said sleeve has a generally hyperbolic shape.

5. A disconnect according to claim 3 wherein said wires are skewed with respect to the axis of their associated sleeve such that said sleeve has a helical configuration.

6. A disconnect according to claim 5 wherein said wires are flat.

7. A disconnect according to claim 3 wherein said sleeve expands upon insertion of said rod and constrictively engages said rod.

8. A disconnect according to claim 1 wherein said housing includes a plurality of internal walls defining first and second recesses for receiving said input and output terminals respectively, and apertures in said walls which are aligned with said openings in said terminals and through which said rods pass to engage said terminals.

9. A disconnect according to claim 8 including a detachable closure wall closing off said recesses when said closure wall is secured to said housing and providing access to said recesses when said closure wall is detached from said housing.

10. A disconnect according to claim 9 wherein said terminals are readily removable from said recesses when said closure wall is detached from said housing.

11. A disconnect according to claim 1 including a switch positioned in said housing adjacent a said terminal for engaging a said rod associated with such a said terminal for signaling engagement or disengagement of such a said rod with such a said terminal.

12. A disconnect according to claim 1 wherein each said rod includes a shank portion engaging said terminal, a stud portion for securing said rod to said cover, and a flange intermediate said shank and stud portions engaging in a said terminus.

13. A disconnect according to claim 12 wherein said stud portion is threaded and is secured to said cover by a nut.

14. A disconnect according to claim 13 wherein said cover includes a well containing said nut.

15. A disconnect according to claim 14 wherein said nut has a polygonal perimeter and its associated well conforms to the shape of said perimeter for preventing rotation of said nut.

16. A disconnect according to claim 13 including a lid detachably secured to said cover providing access to said nut.

17. A disconnect according to claim 16 wherein said housing includes a peripheral lip defining a mouth through which said rods enter said housing, a first fixed detent projecting inboard said housing at said mouth, and a first catch operatively associated with said cover to engage said detent to lock said cover in place on said housing.

18. A disconnect according to claim 9 including a hinge permanently joining one edge of said closure wall to said housing and a clasp detachably joining the opposite edge of said closure wall to said housing.

19. A disconnect according to claim 18 wherein said clasp comprises a second detent on said housing and a second catch on said opposite edge for engaging said second detent when said closure wall is pivoted about said hinge to close off said housing.

20. A disconnect according to claim 17 including a handle between said cover and said lid carrying said catch and slidable between a detent-engage and a detent-disengage position.

* * * * *